United States Patent
Dupin et al.

(10) Patent No.: US 8,666,914 B1
(45) Date of Patent: Mar. 4, 2014

(54) RANKING NON-PRODUCT DOCUMENTS

(75) Inventors: Benoit J. Dupin, Sunnyvale, CA (US); Dimitris Margaritis, Cupertino, CA (US); Steve L. Martin, Mountain View, CA (US); Diane Hernek, Oakland, CA (US); Nicholas E. Matsakis, Redwood City, CA (US); Yue Zhou, Sunnyvale, CA (US)

(73) Assignee: A9.com, Inc., Palo Alto, CA (US)

( * ) Notice: Subject to any disclaimer, the term of this patent is extended or adjusted under 35 U.S.C. 154(b) by 337 days.

(21) Appl. No.: 13/113,979

(22) Filed: May 23, 2011

(51) Int. Cl.
G06F 15/18 (2006.01)

(52) U.S. Cl.
USPC .......................................................... 706/12

(58) Field of Classification Search
USPC ..................................................... 706/12, 62
See application file for complete search history.

(56) References Cited

U.S. PATENT DOCUMENTS

| | | | | |
|---|---|---|---|---|
| 6,684,205 | B1 * | 1/2004 | Modha et al. | 1/1 |
| 7,373,313 | B1 * | 5/2008 | Kahle et al. | 705/26.3 |
| 8,290,967 | B2 * | 10/2012 | Vailaya et al. | 707/755 |
| 2004/0215606 | A1 * | 10/2004 | Cossock | 707/3 |
| 2006/0212142 | A1 * | 9/2006 | Madani et al. | 700/49 |
| 2008/0215561 | A1 * | 9/2008 | Yu et al. | 707/5 |
| 2009/0037410 | A1 * | 2/2009 | Jones et al. | 707/5 |
| 2009/0327264 | A1 * | 12/2009 | Yu et al. | 707/5 |
| 2010/0114928 | A1 * | 5/2010 | Bonchi et al. | 707/759 |
| 2010/0257171 | A1 * | 10/2010 | Shekhawat | 707/738 |
| 2010/0325133 | A1 * | 12/2010 | Rounthwaite et al. | 707/759 |
| 2011/0072033 | A1 * | 3/2011 | White et al. | 707/768 |
| 2011/0295857 | A1 * | 12/2011 | Aw et al. | 707/739 |

OTHER PUBLICATIONS

Mobasher et al, "Discovery of Aggregate Usage Profiles for Web Personalization", Workshop on Web Mining, Webmine 2000.*
Zhao et al, "Criterion Functions for Document Clustering Experiments and Analysis", University of Minnesota, Department of Computer Science / Army HPC Research Center, Nov. 29, 2001.*
Kanoulas et al, "Modeling the Score Distributions of Relevant and Non-relevant Documents", Springer-Verlag Berlin Heidelberg 2009, ICTIR 2009, LNCS 5766, pp. 152-163, 2009.*
Bodapati, "Recommendation Systems with Purchase Data", Journal of Marketing Research, vol. XLV (Feb. 2008), 77-93.*
Sasaki et al, "Empirical Analysis of Grouping Web Pages Using Vector Space Model for Link Structures", 2008 IEEE Conference on Soft Computing in Industrial Applications (SMCia/08), Jun. 25-27, 2008, Muroran, Japan.*

* cited by examiner

*Primary Examiner* — Jeffrey A Gaffin
*Assistant Examiner* — Ilya Traktovenko
(74) *Attorney, Agent, or Firm* — Novak Druce Connolly Bove + Quigg LLP

(57) ABSTRACT

Systems, methods, and apparatus are provided for determining relevance of documents to queries. An optimized relevance function is configured to determine a relevance value of documents of a first type that are linked to documents of a second type. The relevance function is optimized to satisfy certain criteria. According to one criterion, a relevance value produced by the optimized relevance function, when invoked for documents of the first type, should have a locally maximal degree of fit to the results of the existing relevance function for the sample training documents of the second type. An assessed degree of fit of a document can be increased or decreased to arrive at an optimized relevance function that ranks the documents of the first type in a desired position relative to documents of the second type in search results. The degree of fit can be assessed by a user-provided objective function.

28 Claims, 11 Drawing Sheets

RANKING NON-PRODUCT DOCUMENTS

BACKGROUND

As electronic commerce becomes more prevalent, consumers are purchasing more products through electronic sources, such as online web sites. Products, such as recorded audio and video, books, and other media, are presented for sale on "product pages" that include information about the products, such as photographs, descriptions, availability, consumer reviews, and lists of related products. Such products are ordinarily associated with authors, performers, composers, and other types of entities that produce the products. For example, a book has an associated author entity, and a music recording such as a Compact Disc or audio file has an associated artist entity. A particular entity can be associated with multiple products, such as several different books authored or published by the same entity.

Information about these entities, such as biographical summaries and links to product pages for the entity's products, can be presented on what are referred to herein as "entity pages." Entity pages can also include samples of the entity's work, discussion forums, and other information related to the entity. For example, a particular artist, such as the English rock band Pink Floyd, may have an entity page that presents images of the members of Pink Floyd, a history of the band, and short descriptions and images of Pink Floyd's albums, with links to album product pages. Thus the entity page does not necessarily present a direct purchase option for a product, but does provide information and links to product pages that do provide purchase options such as purchase buttons or "add to cart" buttons.

Entity pages can represent other types of entities as well, such as brands that encompass multiple products, and any other entities that have associated products. In contrast to product pages, entity pages are ordinarily non-purchasable, i.e., the entity pages do not directly represent purchasable products, but instead include information about, and links to, product pages that can be used to purchase the products. Entity pages are similar to product pages in that both types of pages are accessible by web addresses such as Uniform Resource Locators (URLs) and are therefore ordinarily accessed by users via web links that appear on other pages.

A product page can also include a link to the entity page for that product, to allow a user to find out about the entity and other products by the entity. In another example, a link to the entity page can appear in the results of a search for a query that is relevant to the entity or the entity's products. For example, a search query for a particular author can produce a list of links to product pages for the author's books, along with a link to an entity page that provides details about the author. Existing search engines place the entity page at a fixed position in the search results, such as the second-highest position. However, the second-highest position is not always an appropriate position for the entity page, because, for example, the product pages near the second position are not necessarily for that entity. Placement of the entity page at a fixed position can therefore result in poorly-organized search results and a diminished user experience.

BRIEF DESCRIPTION OF THE DRAWINGS

Various embodiments in accordance with the present disclosure will be described with reference to the drawings, in which.

DETAILED DESCRIPTION

Figure 1:
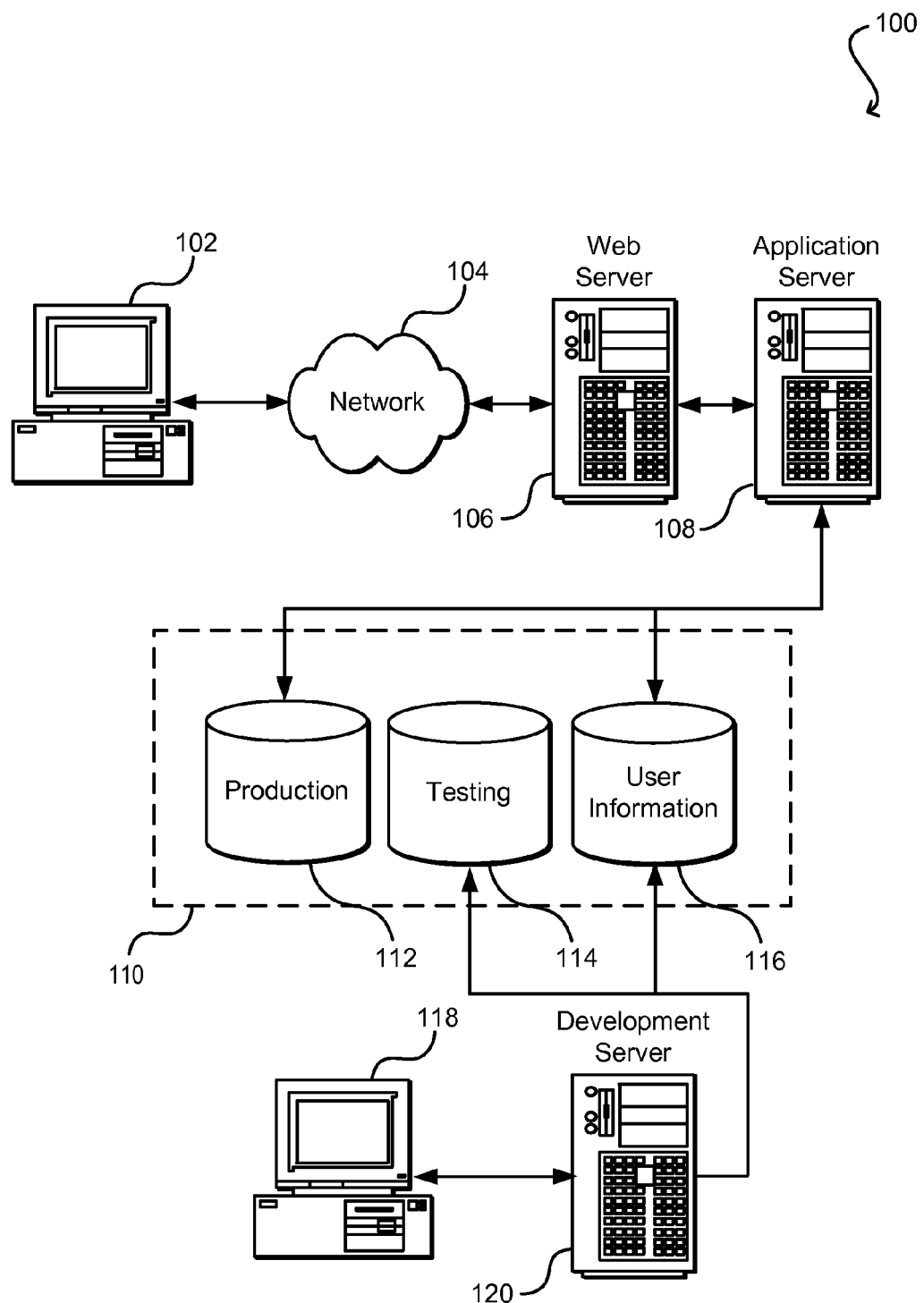
FIG. 1 illustrates an environment in which various embodiments can be implemented.

Systems and methods in accordance with various embodiments of the present disclosure may overcome one or more the aforementioned and other deficiencies experienced in conventional approaches to presenting and/or ordering information in an electronic environment. In one embodiment, an entity page ranking algorithm is used that attempts to generate a ranking value for an entity page without knowledge of the ranking values of other product and/or entity pages in the search results, such that the entity page is likely to be placed in a desired position in the list of search results for a query when the results are sorted by ranking value. Given a query, the method determines a ranking function that attempts to produce the desired ranking values for given entity pages. The desired position in the search results may be, for example, between the first and second product pages for that entity in the search results.

In accordance with various embodiments, when a search query for product pages is received by a search engine, and an entity page, which describes an entity such as an artist or author, matches the query or is associated with the product pages, the entity page is included in the search results at or near a desired ranking position. The ranking position is determined in accordance with a desired relation between the entity page and the product pages. The ranking position is based upon a relevance value for the entity page calculated by a relevance function. The relevance function quantifies the entity page's relevance to the search query by producing a relevance value that, when used in the search engine and compared to relevance values of the product pages, places the entity page at or near the desired ranking position.

The desired ranking position may be, for example, between the first and second product pages associated with that entity. The relevance value can be proportional to characteristics of the entity page so that, for example, entity pages that include substantial content or have other desirable features are ranked higher than entity pages that have less content or fewer desirable features.

A relevance function optimizer optimizes the entity page relevance function to closely fit an existing relevance function for product pages by, for example, finding the parameters of a linear relevance function along multiple axes that represent features of the entity page, such that the value of the relevance function maximizes an objective function that measures the degree to which the relevance function fits the desired results for training data. The optimized relevance function can then be used by the search engine to rank entity pages, so that entity pages will be interspersed with product pages and placed at or close to the desired position in the search results.

In one or more embodiments, the desired ranking position is expressed in the objective function in terms of the information known at the time the search is performed, including relevance values and rankings of the product pages associated with the entity. This function expresses the objective of the ranking technique. The desired properties of the entity page ranking can be changed by changing the objective function. In one aspect, a user such as a search engine administrator or online store developer can define desired ranking criteria for entities in the search results by defining a new objective function to score the relevance function results in accordance with how well the results fit the desired criteria.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Aspects of the various embodiments can be utilized on the production side or the development side. These aspects also can be used in other environments, where there may not be such a separation, or where there may be other portions such as a dedicated test server (not shown) or other such devices. Arrangements for testing development and production code are known in the art and will not be discussed herein in detail.

Figure 2:
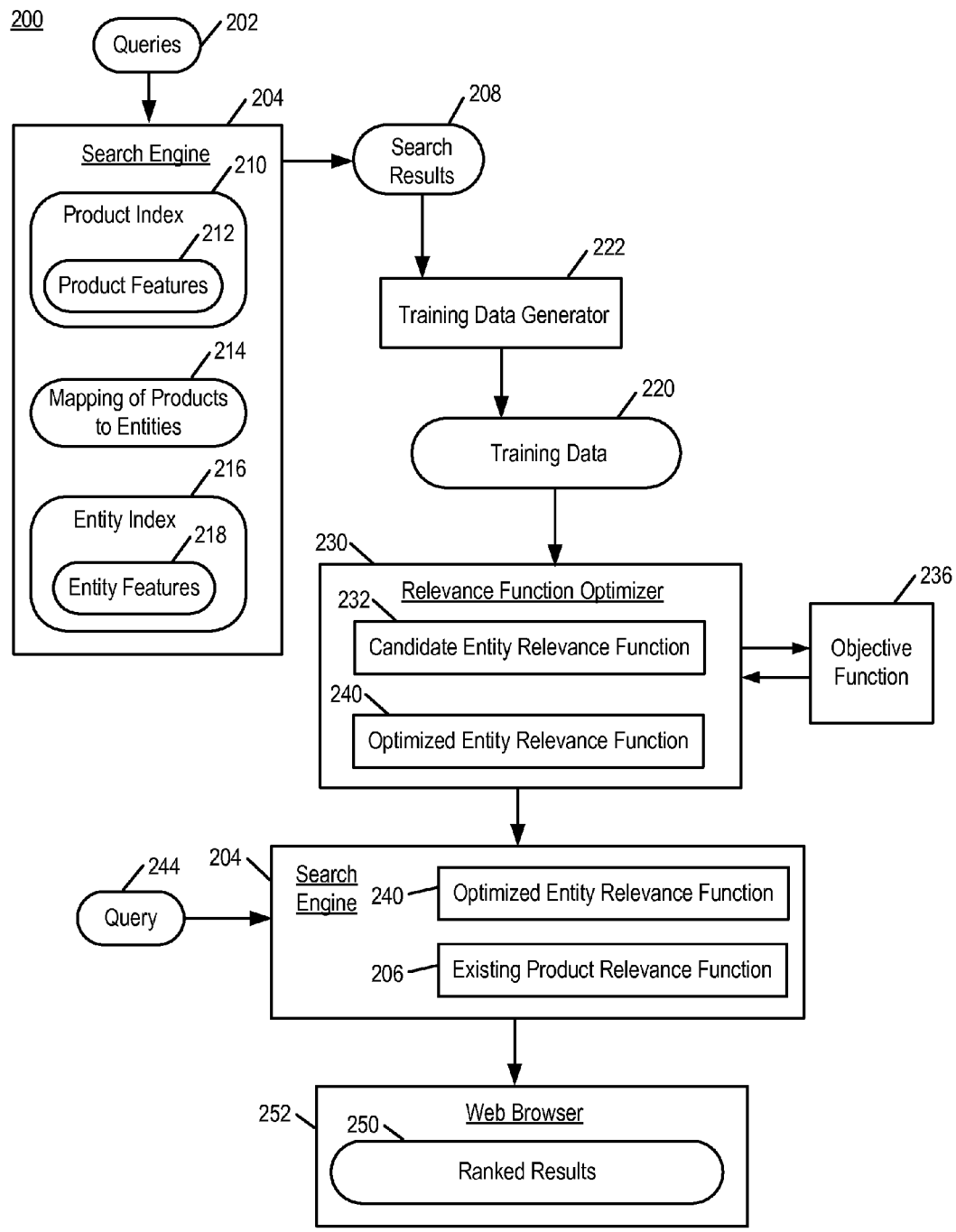
FIG. 2 illustrates a system for implementing entity page ranking in accordance with one embodiment.

FIG. 2 illustrates an example of an entity page ranking system 200 that can be implemented in such an environment in accordance with one embodiment. When, for example, a search query for web pages related to products such as musical recordings or books is received by a search engine, and the search engine finds an entity, such as an artist or author, associated with a product that matches the search query, an entity page describing the entity is included in the search results at or near a desired position, e.g., between the first and second products of that entity. In this example, search queries 202 are received by a search engine 204, which searches for product and entity pages in a database of items such as products, entities, web pages, and provides ranked search results 208 that refer to product and entity pages deemed relevant to the search query 202. The search results 208 are ranked in decreasing order of relevance, so that higher-ranked search results ordinarily have higher relevance to the search query 202. The search results 208 can be displayed or presented to a user of the client device 102 in an application program such as a web browser 252. Each of the search results 208 can include a web link that, when selected, opens a page with details about the corresponding item and provides user interface features for purchasing the item or adding the item to an online shopping cart. The search results 208 can include text and links to pages such as entity pages and product pages, and it should be understood that references to placing entity pages in search results 208 can refer to placing a reference such as a web link to the entity page in the search results, as links to pages, and not the pages themselves, are ordinarily included in search results.

Existing approaches to placing entity pages in search results 208 have focused on placing the entity page at a fixed location in the list of search results 208, e.g., at the second position in the list. However, placing the entity page at a fixed location does not take into account the content or other characteristics of the entity page, which may indicate that the entity page is more suitable to be displayed at a different location in the search results. The techniques described herein can place the entity page at a location in the search results that varies dynamically across different searches and corresponds to a relevance score computed for the entity page.

The search engine 204 uses a product relevance function 206 to determine relevance values of items in the database for a given query 202, and returns the most relevant items as the search results 208 in order of their determined relevance to the query 202.

The search engine 204 has access to a product index 212 that lists the products and can include features 212 of the product pages, a mapping 214 that associates the products with entities, and an entity index 216 that lists the entities and can include features 218 of the entity pages. The queries 202 received by the search engine 204 are associated with products and/or entities that are referenced by the queries 202 and/or included in search results 208 produced by execution of the queries. The search results 208 can include the product page links and their associated entity page links. The search results 208 thus include sample output of the existing product ranking function 206. Other database structures are possible, e.g., the query and resulting product page link can be stored in the product index 21. As another example, the indexes 210, 216 and the mapping 214 can be stored separately from the search engine 204. In another example, the product index 210 can be stored in the same database table as the mapping 214 and/or the entity index 216. The information in the search results 208, the product index 210, the mapping 214, and the entity index 216, is used by a relevance function optimizer 230 to create an optimized entity relevance function 240 for ranking entities in search results that also include products. The search engine's existing product ranking function 206 itself is not used directly when creating the optimized entity relevance function 240 because the existing product ranking function 206 is ordinarily not accessible to users of the search engine 204. However, the output of the existing product ranking function 206, for a number of different queries 202, is available from the search engine 204 and can be used by the relevance function optimizer 230 as training data 220 to generate an optimized entity relevance function 240 that fits the training data 220.

In an existing "static" entity page ranking technique of placing the entity page at the second position in combined search results 250, the position of the entity page is fixed even if a different product page that is more relevant to the query 202 than is the entity page would be more appropriately placed at the second position in the combined search results 250, with the entity page being placed at the third position or in some other position. Note that the combined search results 250 can include both product and entity pages. Assigning relevance values to entities as described herein enables the position of the entities in combined search results 250 to vary based upon features or characteristics of the entity pages. For example, the combined search results 250 can include product pages of other entities at positions between the first and second ranked product pages, and, using the entity page ranking techniques described herein, the entity page can be placed at an appropriate position between the entity's first and second products. If there are other products or entities in the search results between the entity's first and second products, then the entity page can be placed at a position between the first and second products based on the entity page's relevance.

Figure 4:
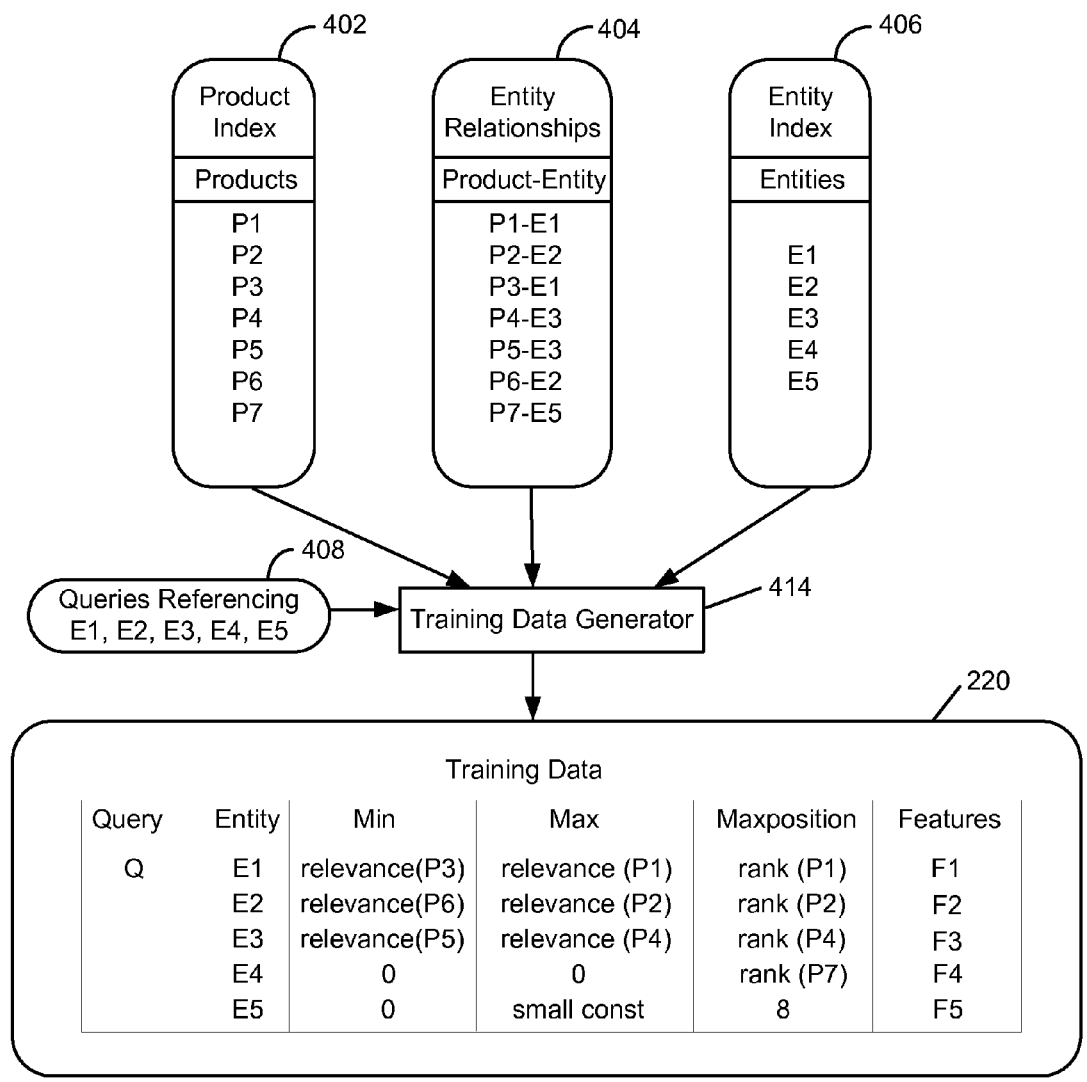
FIG. 4 illustrates data for entity page ranking in accordance with one embodiment.

In one or more embodiments, a training data generator 222 converts the search results 208 into the training data 220, which is a structure more readily usable by the relevance function optimizer 230 In one embodiment, the training data 220 includes one or more entries of the form:

(Query, list of (entity identifier, min, max, maxposition, list of features))

where Query is a search query, entity identifier identifies a particular entity that matches the query, max is the relevance value of the first-ranking (i.e., top ranking) matching product by the identified entity in the results of the query, min is the relevance value of the second-ranking matching product by the identified entity in the results of the query, maxposition is the rank of the top-ranking product by the identified entity in the results of the query and list of features is a list of values that depend on the Query and the entity identified by the entity identifier. An example of the operation of the training data generator 222 to generate training data 220 is shown in FIG. 4.

As introduced above, the objective of an optimized entity relevance function 240 is to produce a relevance value for a given entity page that, when compared to relevance values of products in the search results 250 (produced by the existing product relevance function 206), places the entity page at or near the desired position in the search results 250. Although the positions of the entity pages in search results 250 are determined by the optimized relevance function 240 provided to the search engine 204, in one or more embodiments the optimized relevance function 240 is not specified explicitly by a user. Instead, the user provides an objective function 236, which can invoke the relevance function 240 to generate a score that indicates how well the relevance function's result fits desired characteristics such as a given entity being positioned between a first-ranked and a second-ranked product by that entity, i.e., a degree of fit. The objective function 236 then returns the score, which is used by the relevance function optimizer 230 to optimize the fit of the relevance function 240.

Figure 10:
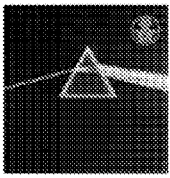
FIG. 10 illustrates search results including product and entity pages in accordance with one embodiment.

The relevance function optimizer 230 uses the training data 220 and the objective function 236 to generate one or more candidate entity relevance functions 232, each with a different set of parameters, to identify a particular set of parameters that produces the candidate entity relevance function 232 that maximizes the score produced by the objective function 236. In one example, the objective function 236 is applied to a sum of candidate entity relevance function 232 values calculated for the entities in the training data 220. The parameters that maximize the objective function 236 are used as the parameters of the resulting optimized entity relevance function 240. The resulting optimized entity relevance function 240 can be provided to the search engine 204, which can use the optimized function 240 to generate relevance values for entity pages that match a query 244 (which may be different from the queries 202 from which the optimized function 240 is generated), in addition to using the product ranking function 206 to generate relevance values for product pages. The search engine 204 produces the ranked results 250, which can include product page links (e.g., Uniform Resource Locators) interspersed with one or more entity page links, with the position of each page link in the search results being determined by the relevance value of the associated page. The ranked results 250 can be presented to a user in an application program such as a web browser 252. An illustration of search results in accordance with one or more embodiments is shown in FIG. 10.

The components shown in FIG. 2, including the search engine 204, can be implemented on the web server 106 and/or the application server 108 of FIG. 1. For example, the queries 202 can be received by the web server 106 from the client device 102 via the network 104. The training data generator 222 and relevance function optimizer 230 can be located at the application server 108. As can be appreciated, there can be many other combinations, additional components, and optional components in the implementation of FIG. 2, and these variations can be used to implement various aspects as would be apparent to one of ordinary skill in the art in light of the present disclosure.

Figure 3:
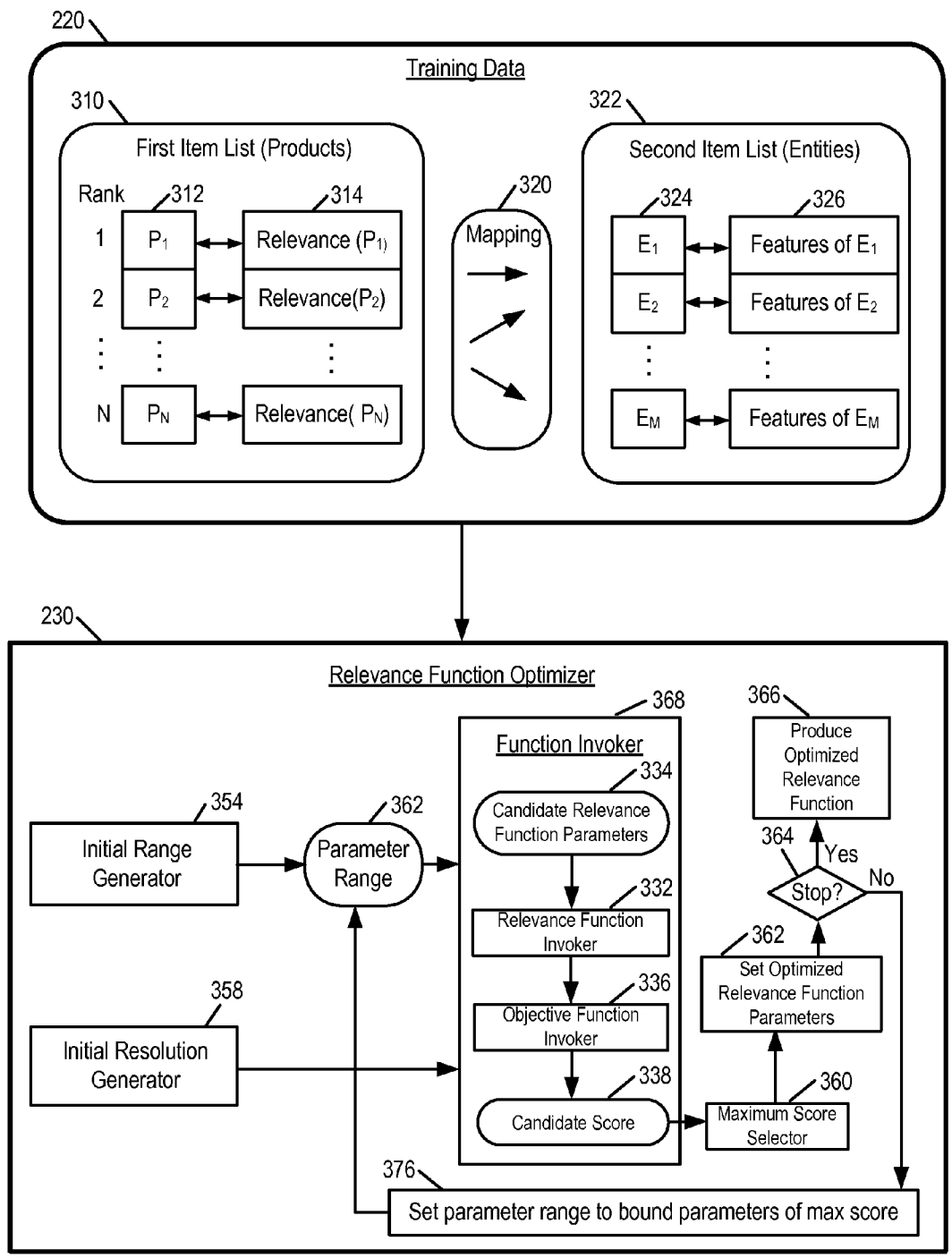
FIG. 3 illustrates a relevance function optimizer in accordance with one embodiment.

FIG. 3 illustrates a relevance function optimizer 230 configured to generate an optimized relevance function 372 in accordance with one embodiment. The terms "optimized relevance function" and "optimized relevance function parameters" are used interchangeably herein, because the values of the parameters can be used to construct the optimized relevance function. Similarly, the terms "candidate relevance function" and "candidate relevance function parameters are used interchangeably, since the candidate relevance function can be determined from the candidate relevance function parameters. The term "optimize" as used herein refers to a technique of finding a relevance function that "fits", i.e., produces results similar to, a known existing relevance function 206, to a desired degree of accuracy. The existing relevance function 206 generates a first item list 310 of the relevance function for particular values, including relevance values 314 for a first type of data items 312, such as product pages or other documents. Data items of the first type are illustrated in a first item list 312 that is sorted by the relevance value 314 associated with each of the first items 312.

In one or more embodiments, the optimized relevance function 372 can determine relevance values for a second type of data items, such as entity pages. Since the optimized relevance function 322 is generated based on the existing relevance function 314 and a second item list 322 of data items 324 of the second type, the relevance values produced by the optimized relevance function 372 can be used along with the relevance values 314 produced by the existing relevance function 312 in a single sorted, i.e., ranked, list of interspersed items of both the first and second types.

The list representation 310 of the existing product relevance function 206 is a sample of the function's output for specific data points. A complete representation of the existing function, e.g., an analytical solution 206, is not necessarily known, as the complete representation may be internal to the search engine 204 and unavailable to the entity ranking system. Therefore, in one embodiment, the relevance function optimizer 230 uses an optimization technique to generate the candidate optimized relevance function 334 based on the relevance values of items in the first item list 312 and further based on a mapping association 320 that associates items in the first item list 312 (e.g., products) with items 324 in the second item list 324 (e.g., entities). The first item list 312 and its associated relevance values 314, the second item list 324, and the mapping 320 between the two lists is available in the training data 220.

The candidate entity relevance function 334 is, in one example, a weighted sum of page feature values, and the relevance function optimizer 230 uses a non-linear optimization technique to find the values of weight parameters that result in an optimized relevance function 232. In this example, the parameters of the candidate entity relevance function 334 are the weight parameters, and the parameters of the optimized entity relevance function 372 are the optimized values of the weight parameters. The relevance function optimizer 230 can alternatively generate the candidate and optimized relevance functions in other forms, such as support vector machines, artificial neural networks, or the like, using the corresponding techniques, based upon the training data 220. Other optimization techniques can be used, such as, for example, a back-propagation algorithm to generate parameters for a neural network representation of the objective function, or an appropriate technique to generate the parameters for a support vector machine representation of the objective function.

In one or more embodiments, the relevance function optimizer 230 finds parameter values 334 for a linear relevance function 232 along multiple axes that represent features of entity pages, such that the value produced by the relevance function 232 maximizes the objective function 236. The objective function 236 assesses the degree to which the relevance function 232 fits a desired objective. A desired objective may be, for example, positioning entity pages at desired positions in the search results relative to certain product pages. Since the desired positioning of entity pages in search results 250 relative to product pages is expressed in the objective function 236, the desired positioning of the entity page ranking can be changed by changing the objective function. In one aspect, a user such as a search engine administrator or online store developer can define their own desired ranking criteria for entities in the search results by defining a new objective function 236 to score the relevance function results in accordance with how well the results fit the user's desired criteria.

In one or more embodiments, if the desired position of an entity page in search results 250 is between the first and second-highest ranked products of the entity, such as the first and second-highest ranked books by an author, then the entity relevance produced by the entity relevance function 232 is desired to be between the relevance value of the first and second ranked books, and the objective function 236 can provide a "boost" to such an entity relevance function by returning a positive score value.

In one or more embodiments, the desired position of the entity page can be specified to be closer to the first ranked product page of the entity if the entity page is, for example, of high quality, i.e., has substantial content or refers to popular products. The objective function can return a greater value as the entity page's relevance approaches that of the first-ranked product page if the entity page is of high quality. Similarly, the desired position of the entity page can be specified to be closer to the second ranked product page if the entity page is of low quality, and the objective function can return a greater value in that case. In other embodiments, the desired position of the product page can be specified using other criteria instead of the positions of the first and second ranked product pages. For example, the position of the entity page can be specified relative to the three highest ranked product pages (between the first and second for higher quality entity pages, and between the second and third for lower quality entity pages, and not shown in the search results for very low quality entity pages). In another example, the position of the entity page can be specified relative to the product page that matches the greatest number of words in the query, e.g., immediately following that product if the entity page quality is high, or closer to the product page that matches the second greatest number of words in the query if the entity page quality is lower. The objective function can be specified such that it returns a greater (e.g., positive) value for these desired positions, and a lesser value for other positions (e.g., negative). The objective function can return a first value (e.g., 1) to indicate a favorable result of the relevance function, and second value (e.g., 0) to indicate an unfavorable result. In other examples, the objective function can generate its score value as a linear or other type of function of the relevance of the product page, the features of the product page and/or entity page, or an association between product pages and entity pages, e.g., an association established in the training data.

The product relevance values are computed by the product relevance function 206 based on characteristics of the product pages and the query, e.g., how well the product page title matches the words in the query. Since the entity relevance values are computed without knowledge of the other pages that will be in the search results, the entity relevance function is generated using an optimization technique based upon the product relevance function 206, or more particularly, training data 220 that corresponds to the product relevance function, e.g., data 220 that indicates the rank of particular products for particular queries, and the known associations between the products and the entities. The known associations can be provided in the training data 220, e.g., as data that associates particular products with particular entities.

As introduced above, the relevance function optimizer 230 can use an optimization technique, such as non-linear optimization, to generate the entity relevance function 240 based on the training data 220. In one or more embodiments, the generated entity relevance function 240 is a sum of weighted features of an entity page, and is optimized to fit the existing product relevance function 206. The weights are represented by numeric parameter values and are optimized to produce optimized parameter values that characterize the optimized entity ranking function 240.

The degree, i.e., closeness, of the entity relevance function's fit is evaluated by the objective function 236. The objective function 236 evaluates the candidate entity relevance function 232 for given candidate parameters based on multiple product relevance values from the training data 220, and generates a score that indicates the degree to which the candidate relevance function 232, based on the candidate parameters, fits the training data 220. In one example, as described, greater values from the objective function 236 indicate a greater degree of fit. As the degree of fit or closeness increases, the relevance values produced by the candidate entity relevance function 232 for entities are closer to those produced by the existing product relevance function 206 for products.

As discussed above, in one or more embodiments, the candidate entity relevance function 232 is computed as a sum of weighted feature values that are based on features of entity pages. The feature values are weighted by parameter values that correspond to the parameters of the relevance function 232, so that the relevance function 232 is of the form $r = c_1 f_1 + c_2 f_2 + \ldots + c_n f_n$, where n is the number of features. The features can be, for example, a textual score, a popularity score, a page quality score, or the like, as described with reference to FIG. 5.

As introduced above, the objective function 236 measures the degree of fit by computing a value that corresponds to how well the candidate entity relevance function 232 being optimized meets the criteria for fit quality defined by the objective function 236. The objective function 236 can be defined to produce different scores for different ranges of input relevance values, in accordance with the ranking objectives. In one or more embodiments, the objective function produces a value proportional to the degree of the fit. The objective function 236 is described in more detail in FIG. 6.

In one or more embodiments, the relevance function optimizer 230 uses a multi-resolution coarse-to-fine search based on hill climbing to generate the optimized entity relevance function 240. The relevance function optimizer 230 finds a set of points on a multidimensional grid of cells that, when used as the parameter values in the relevance function 240, maximize the objective function 236 relative to other points on the grid. The grid has a dimension for each of the parameters of the function 240, and a resolution is associated with the grid to specify the magnitude and range of the points in each grid cell. An initial range generator 354 generates an initial parameter range 354, and an initial resolution generator 358 generates an initial resolution 360. In other embodiments, the resolution can be changed, e.g., increased, during the optimization process.

A function invoker 368 includes a relevance function invoker 332 that invokes the candidate relevance function for each entity, i.e., tuple of data in the training data 220 to generate candidate relevance values. An objective function invoker 336 invokes the objective function 236 for each result produced by the candidate relevance function and computes the sum of the results of the objective function invocations for the training entities for each point on the grid in the current range 362 at the resolution 358. Each of these points corresponds to a set of candidate relevance function parameters 334 for each invocation of the relevance function 232. The objective function 236 invokes the candidate entity relevance function 232 to generate a relevance value for each point in the training set based on the candidate parameters 334. Thus the objective function 236 determines a candidate score 338 that quantifies the fit of the relevance value of an entity to the training data. A max score selector 360 selects the maximum candidate score 338 produced by the objective function 236. A termination detector 364 evaluates a stopping condition and, if the stopping condition is satisfied, the optimization stops and the optimized entity relevance function is produced at block 366. If the stopping condition is not satisfied, a parameter updater 376 sets the current parameter range 362 to bound the cell in which the parameters 334 that produced the maximum score were found. The stopping condition is dependent upon the optimization technique. When the stopping condition is not satisfied, the function invoker 368 invokes the objective function again over the current range 362 at the resolution 358 using the current parameters 334 that produced the maximum score, and the stopping condition is checked. These operations continue until the stopping condition is satisfied, at which point the current parameter values 334 are used for the optimized relevance function 240.

In other embodiments, the search can be randomized by evaluating the objective function 236 at randomly-sampled positions within each cell a pre-specified number of times, instead of evaluating the objective function at the center of each cell. This randomization allows for evaluating a different and potentially better set of candidate positions each time the optimizer 230 is run with the same number of input data sets, initial bounds, and resolution.

FIG. 4 illustrates training data 400 for entity page ranking in accordance with one embodiment. Training data 220 is collected from a search engine and/or database(s) by the training data generator 222 shown in FIG. 2. The source of the training data can be, for example, a product index 402, entity relationships 404 that associate products, which are listed together with their associated entities in the order of their product ranking for each query issued by the generator, and an entity index 406. The training data generator can use a query sampler to obtain a balanced representation of both popular and unpopular queries. Given a set of queries that produces sets of matching products and matching entities, an entity index 216 such as an artists database or an authors database will be queried to retrieve an entity identifier of each of the matching entities. The same query set is also sent to the product index(es) 210, such as a music or books index, to retrieve the top two highest-ranking product identifiers for the entity and their corresponding relevance scores. The "max" and "min" relevance scores for the entity are set to the relevance of the first and second highest-ranking identified products, respectively. The max and min relevance scores are used in an attempt to reach or approximate an objective of placing the entity page between the first and second-ranked products of the entity. The training data 416 thus produced includes tuples of the form (Query, Entity, Min, Max, Maxposition, Features), where Min is the relevance of the second-highest ranked product for the entity Entity and query Query, Max is the relevance of the highest-ranked product, and Maxposition is the rank of the top-ranking product by that entity in the product results (i.e., the position of the top-ranking product). The Features, e.g., F1, are feature values as described with respect to FIG. 5.

The product index 402 and entity index 406 include products P1, P2, and P3, representing three products, for the given query 402. These products may be, for example, music recordings, books, and the like. The product page P1 is associated with an entity E1. Similarly P2 is associated with an entity E2, and P3 is associated with the entity E1 (e.g., by references or links on the pages P1, P2, and P3, or on entity pages E1, E2, and E3, or by otherwise known associations). For example, the products may be product pages for books, and the entities may be authors, in which case P1 and P3 are product pages for books by author E1, and P2 is a product page for a book by author E2. Note that the entities E1 and E2 can represent the entities or entity pages of the entities. If an entity name is known, the corresponding entity page can ordinarily be identified by a database lookup, so the term "entity" can refer to either an entity's name or the entity's page. Similarly, the term "product" can refer to either a product's name or the product's page. In other examples, P1, P2, and P3 can represent other types of products or items, and E1 and E2 can represent other types of entities that are associated with one or more of E1, E2, and E3, e.g., brands, organizations, and the like.

Referring to the example of FIG. 4, one or more queries 408 are executed, and, as shown by the resulting product index 402, entity relationships 404 (which is ordered by product rank), and entity index 406, the query results reference the entities E1, E2, E3, E4, and E5. The entities may be, for example, artists, authors, brands, and the like. A training data generator 414 generates the training data 416 by retrieving the product identifiers (e.g., P1) from the product index 402, and identifying the entities 406 associated with each of the products 402 by the entity relationships 402. For example, the first association P1-E1 in the entity relationships indicates that P1 is associated with, e.g., is a product by, E1. The training data generator then computes the training data 220 for each entity. For example, for entity E1, the training data generator 414 computes Min, which is the relevance score of the second-highest ranked product (P3) by entity E1, shown as relevance (P3), Max, which is the relevance score of the highest-ranked product (P1) of entity E1, shown as relevance(P1), and Maxposition, which is the rank of the highest-ranked product (P1) of entity E1 (1 in this case). The function relevance(x) produces the relevance value of the product x according to the existing product relevance function 206, and the function rank(x) produces the ranking position of the given product x in the search results for the query Q. The ranking of the search results is represented in the entity relationships 404, which are ordered in decreasing order by product relevance.

The training data 220 therefore includes tuples as shown in the first column of Table 1. The remaining columns of Table 1 are illustrative and list the query, entity, first-ranked product, second-ranked product, top rank of a product (i.e., rank of the 1st ranked product), and features for each entity.

TABLE 1

| Query | Tuple | Entity | 1st ranked | 2nd ranked | Top rank | Features |
|---|---|---|---|---|---|---|
| Q1 | (E1, relevance(P3), relevance(P1), rank(P1)) | Entity 1 | P1 | P3 | 1 | F1 |
| Q1 | (E2, relevance(P6), relevance(P2), rank(P2)) | Entity 2 | P2 | P6 | 2 | F2 |
| Q1 | (E3, relevance(P5), relevance(P4), rank(P4)) | Entity 3 | P4 | P5 | 4 | F3 |
| Q1 | (E4, 0, relevance(P7), rank(P7)) | Entity 4 | P7 | none | 7 | F4 |
| Q1 | (E5, 0, small constant, 8)) | Entity 5 | None | none | none | F5 |

Figure 5:
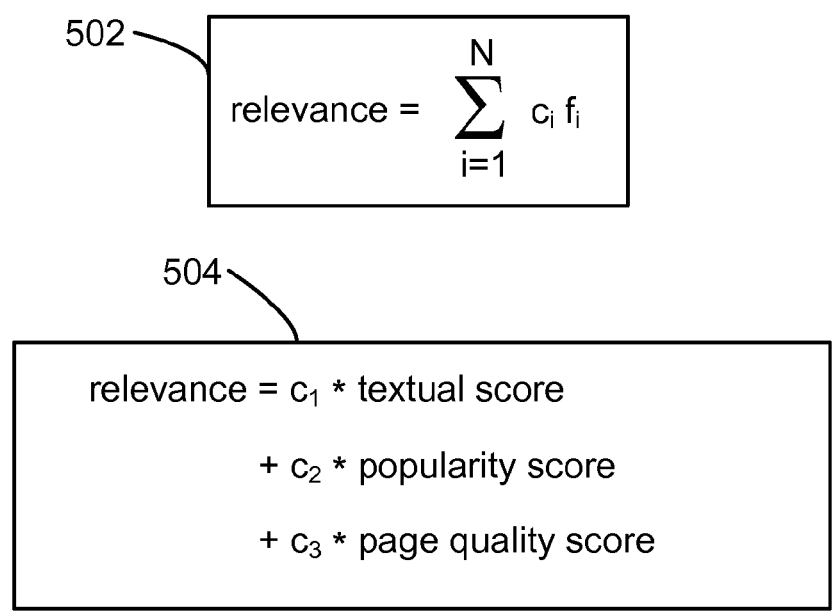
FIG. 5 illustrates a relevance function in accordance with one embodiment.

FIG. 5 illustrates a relevance function in accordance with one embodiment. A relevance function 502 is computed as a sum of products of N parameters $c_i$ and features $f_i$. For example, a particular relevance function 504 is based on a weighted sum of 3 features: a textual match score, a popularity score, and a page quality score. Each feature is represented by a numeric value, and a weight coefficient $c_i$ is associated with the feature. In one or more embodiments, a particular relevance function is therefore a set of coefficient values to be multiplied by associated feature values. The relevance function can be evaluated to determine a relevance value for a document or page by multiplying the parameters by the feature values for that page and adding the products together to produce a relevance value. The textual match score can be determined using a text matching technique such as Term Frequency-Inverse Document Frequency ("TF-IDF") or the like. TF-IDF is a measure of the importance of a word to a document in a collection or corpus. The importance increases in proportion to the number of occurrences of the word in the document, but decreases in proportion to the frequency of the word in the corpus, so that words that occur infrequently in the collection are given more weight, and words that occur frequently in the collection are given less weight. The popularity score can be, for example, a number of times a page or document has been viewed. The page quality score can be a measure of the quality of the content of the page, independent of the query itself. The quality score represents the weighted percentage of the possible features on entity pages that actually exist on a given page. For example, the quality score for a page will be higher if the page includes a picture, a biography, something to buy, a discussion, or the like.

Figure 6:
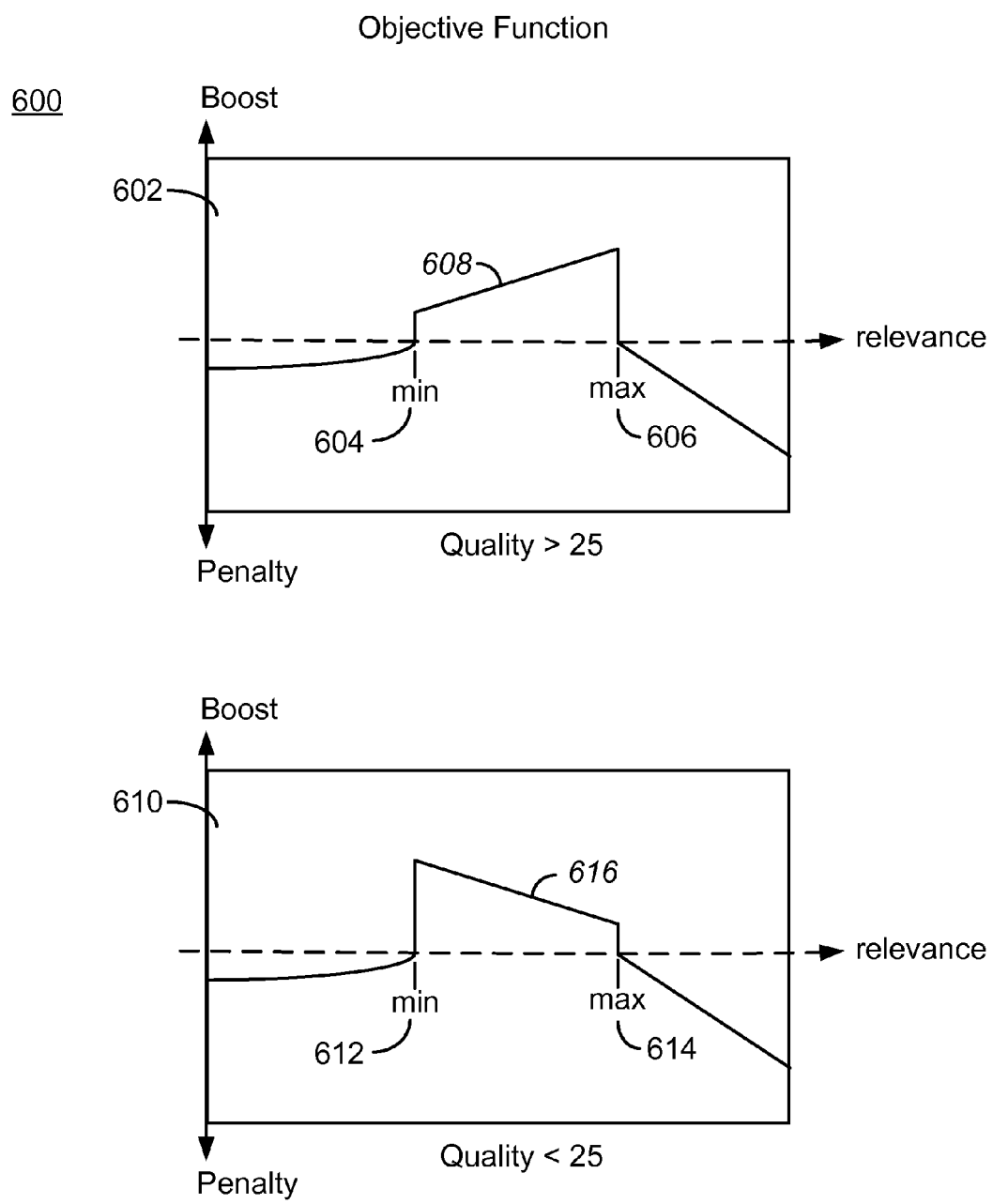
FIG. 6 illustrates an objective function in accordance with one embodiment.

FIG. 6 illustrates an objective function in accordance with one embodiment. As illustrated by the example objective function in FIG. 6, to place the entity page between the first and second ranking products in the search results 250, the objective function 236 can be configured to produce positive "boost" values 608 when the candidate relevance function produces an entity relevance score between the relevance scores of the first and second ranked products (labeled max 606 and min 604, respectively, on the horizontal axis). To strongly discourage ranking of the entity page above the first ranked product page, the objective function 236 can be configured to produce a negative "penalty" value when the candidate relevance function 232 produces a relevance score greater than the relevance score 606 of the first ranked product (which, if used in search results, would result in the entity page being ranked above the first ranked product). Further, the candidate relevance function 232 can be discouraged from ranking the entity page below the second-ranked product page by configuring the objective function 236 to return a negative value, such that the negative value slowly increases but remains negative as the score produced by the candidate relevance function increases up to the score 604 of the second ranked product. Other objective functions are possible and can be defined in accordance with the desired placement of the entity pages relative to the product pages.

In one or more embodiments, as shown in a first graph 602, the objective function 236 can use a quality metric based on the entity page to generate a score 608 for pages of high quality (e.g., quality>25%) that increases as the relevance produced by the relevance function increases from the relevance value 604 of the second ranked product page to the relevance value 606 of the first ranked product page (and decreases rapidly as the relevance function increases past the relevance value of the first ranked product page). As shown in a second graph 610, the candidate relevance function 232 can be discouraged from ranking the entity page below the second ranked product page by configuring the objective function to return a negative value for candidate relevance functions that produce a relevance score below the relevance value 612 of the second-ranked product page. The scores produced by the objective function 236 for different candidate relevance functions can then be compared to find the maximum score, which corresponds to the optimized candidate relevance function 240 as assessed by the objective function 236. The selected candidate relevance function can then be provided to the search engine 204. The search engine 204 can use the optimized entity relevance function 240 to compute entity page relevance scores that place the entity pages between the first and second ranked product pages in the search results.

Figure 7A:
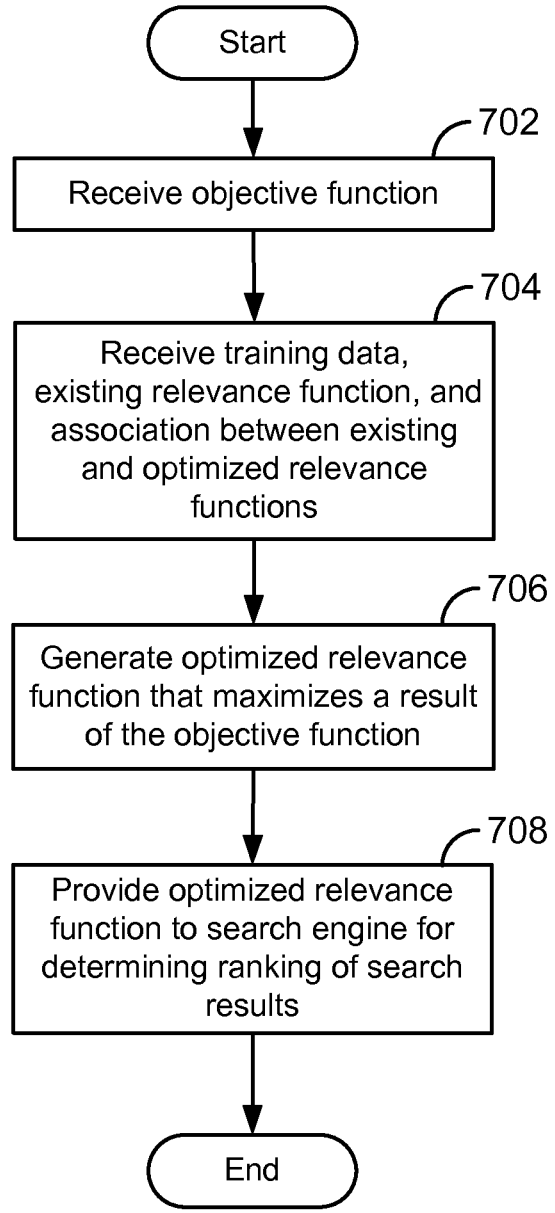
FIGS. 7A and 7B illustrate methods of optimizing a relevance function that can be used in accordance with one embodiment.
Figure 7B:
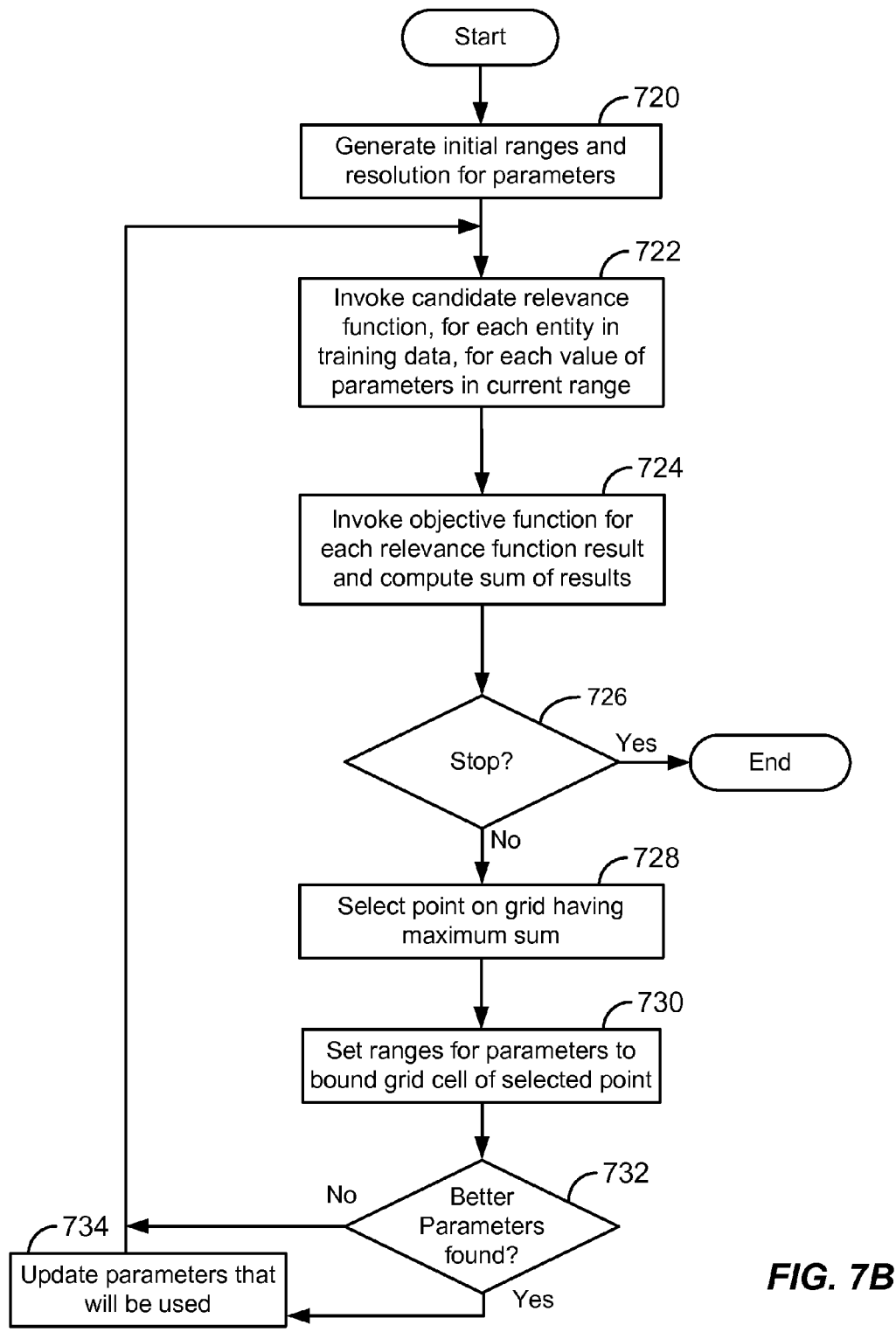

FIGS. 7A and 7B illustrate methods of optimizing a relevance function that can be used in accordance with one embodiment. FIG. 7A receives training data, invokes an optimization process to generate an optimized entity relevance function, and provides the relevance function to a search engine. In more detail, block 702 receives an objective function, and block 704 receives the training data, which represents an existing product relevance function and an association between the training data and data to be provided as input to the optimized relevance function. Block 706 generates the optimized relevance function by finding parameters for features of a linear function. As described, the parameters are values that maximize the value produced by an objective function for the entities in the training data. The value produced by the objective function indicates how close the optimized entity relevance function comes to meeting an objective based on the existing relevance function and the association between the existing and optimized relevance functions. Block 708 provides the optimized relevance function to a search engine, which can then use the optimized function to generate rankings of entities in search results.

FIG. 7B illustrates a method of optimizing a relevance function that can be used in accordance with one embodiment. Block 720 generates an initial range and resolution for the parameter search space. Block 722 invokes the optimized relevance function for each cell in the grid, where the cells are defined by the range and resolution. For example, for each cell (i.e., set of candidate parameters), for each entity in the training data, block 722 invokes the optimized relevance function and stores the sum of the results of the relevance function invocations. Block 724 invokes the objective function for each individual invocation of the relevance function, and computes the sum of the objective function results. Alternately, the objective function can directly invoke the relevance function, so that the sum of relevance functions for all training entities is computed by the objective function, and the objective function's result is based on the sum of relevance values for all entities. Block 726 determines if a stopping condition is satisfied, and if so, stops the process. Block 728 selects the grid point at which the candidate parameters that correspond to the maximum value (or maximum sum) of the objective function are located. Block 730 sets the range to bound the grid cell that contains the selected grid point. If a better set of parameters is found at block 732, block 734 updates the range of parameters that will be used as input to the next invocation of the relevance function. Execution then continues at block 722. The process ends when block 726 determines that the stopping condition is satisfied, i.e., that the desired degree of fit has been achieved.

Figure 8:
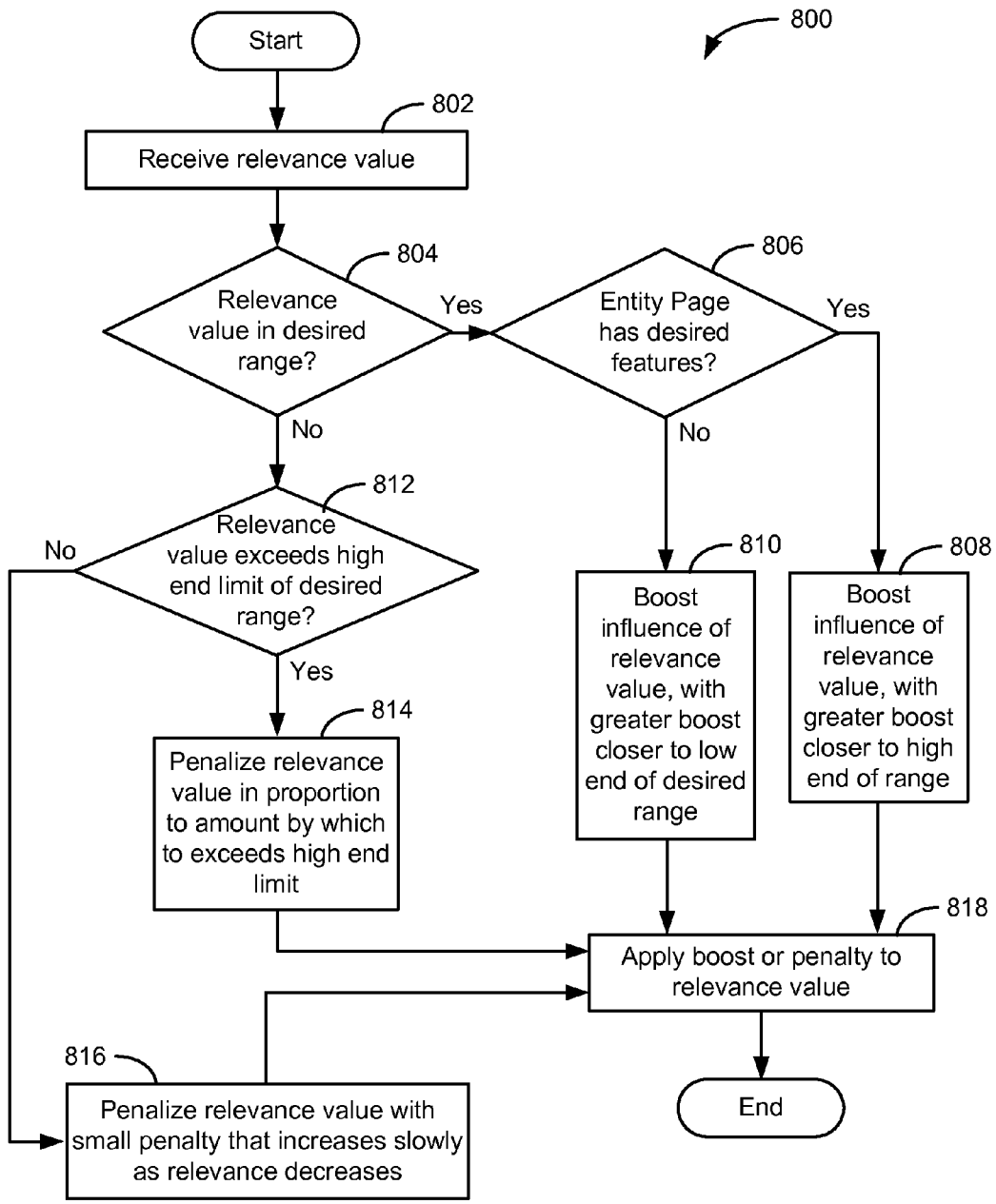
FIGS. 8 and 9 illustrate methods of determining objective function results that can be used in accordance with one embodiment.
Figure 9:
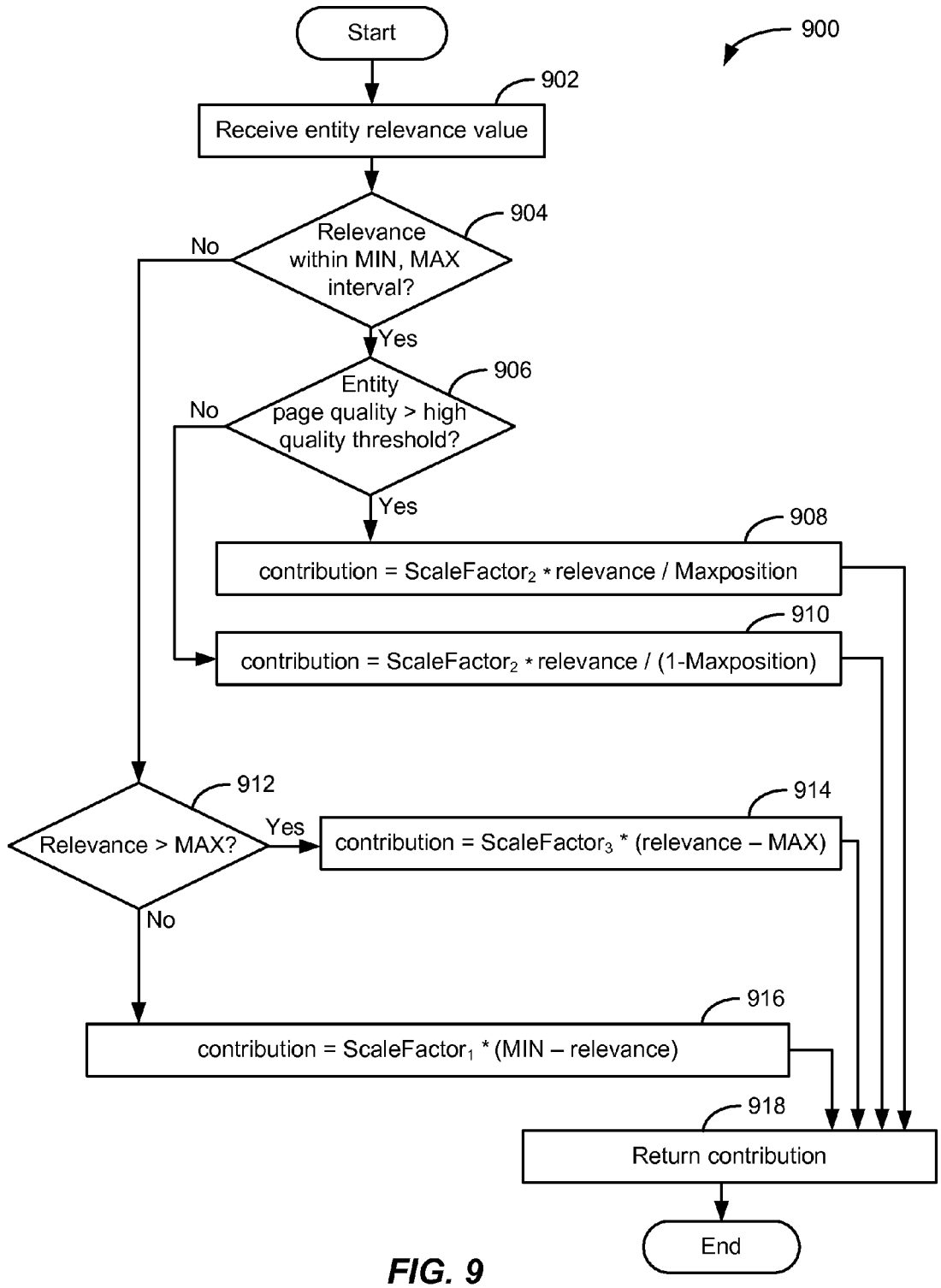

FIGS. 8 and 9 illustrate methods of determining objective function results that can be used in accordance with one embodiment. FIG. 8 illustrates an objective function method 800 in which block 802 receives a relevance value from a relevance function. Block 804 determines if the relevance value is in a desired range, e.g., in a range of relevance values in which the entity being considered should be placed. If so, block 806 determines if the entity page has certain desired features, e.g., is of high quality, which in one example is a quality score greater than 25 on a scale of 1 to 100. The quality measure may be, for example, a measure of how much content is present on the page. If so, block 808 boosts the influence of the received relevance value, with greater boost closer to the high end of the range (e.g., closer to the highest-ranked product), and less boost closer to the low end of the range. If the entity page has a quality score less than or equal to 25, block 810 boosts the influence of the relevance value, but with greater boost closer to the low end of the range (e.g., closer to the second highest-ranked product), and less boost closer to the high end of the range.

If block 804 determines that the relevance value is not in the desired range, then block 812 determines whether the relevance value exceeds the high limit of the desired range (i.e., is above the desired range). If so, block 814 penalizes the relevance value in proportion to the amount by which it exceeds the high limit, using a relatively strong penalty to strongly discourage relevance values that would rank an entity higher than the top-ranked product. If block 812 determines that the relevance value does not exceed the high limit of the desired range, then the relevance value is below the lower limit of the desired range. In this case, block 816 penalizes the relevance value with a relatively weak penalty that increases slowly as the relevance decreases, in proportion to the amount by which the relevance value is less than the low-end limit. Block 818 then applies the boost to the received relevance value, e.g., by returning the boost as a score.

FIG. 9 illustrates an objective function process that evaluates the fit of a given relevance score to a tuple of training data. Block 902 of an objective function method 900 receives a relevance score, and block 904 determines whether the relevance score is within an interval defined by Min and Max parameters. If so, block 906 determines if the quality of a given entity page for which the relevance score is being calculated is high (e.g., greater than 25%). If so, block 908 sets a contribution quantity to the product of a second scale factor, and a relevance of a product page associated with the entity page, divided by a Maxposition parameter from the training data tuple. Otherwise, if the entity page quality is less than or equal to 25%, block 910 sets the contribution quantity to a similar expression, but with 1-Maxposition in place of Maxposition, so that the contribution will be weighted toward the lower (Min) end of the interval between Min and Max, which corresponds to the second highest ranked product associated with the entity. Note that the rank of the top product is 1, and the ranking value increases toward the lower end of the interval, e.g., the rank of the tenth-ranked product is 10. If block 904 determines that the relevance is not within the Min, Max interval, then block 912 determines if the relevance is greater than Max. If so, block 914 sets the contribution quantity to the product of a third scale factor and the relevance score of the product page minus Max. Otherwise, if the score is less than or equal to Min, block 916 sets the contribution quantity to the product of a first scale factor and Min minus the relevance score. The goal of the objective function method 900 is to maximize the sum, over each training example (Query, Entity, Min, Max, Maxposition) of a measure of how well the score of Entity fits within the range (Min, Max). If the calculated relevance score falls within the interval (Min, Max), a positive contribution is made to the score, weighted by the position Maxposition, with higher positions receiving more weight. This contribution is scaled greater toward relevance score values nearer Max if the quality is high, otherwise toward Min. If the score falls outside the (Min, Max) interval, a negative contribution will be made to the score. This contribution is proportional to Score-Max if Score>Max, or to Min-Score if Score<Min. The contribution is scaled by a greater factor in the first case than in the second, reflecting the desired ranking of an entity page between the first and second occurrences in the search results of a product by that entity. The contribution will also be scaled by a factor that increases as the ranking of the entity increases in the search results, reflecting a goal that higher-quality entity pages have more influence in the ranking of the entity, and the lower the quality of an entity page, the lower its importance and the smaller the contribution the entity should have to the objective function. This example objective function also reflects a goal of favoring entities with more prominent products in the ranking. The lower the placement of the first product of an entity in the results, the lower the entity's importance should be, and the smaller the contribution the entity should have to the objective function. Block 918 returns the contribution as the result of the objective function.

FIG. 10 illustrates search results including product and entity pages in accordance with one embodiment. An entity web page 1000 for an entity 1002 (Pink Floyd) includes a product search result 1004 (the album Dark Side of the Moon), which links to a product page for that product, an entity search result 1006 (Pink Floyd Store), which links to an entity page for that entity, and another product search result 1008 (the album The Wall), which links to a product page for that product.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of determining relevance of a plurality of entity pages to queries, wherein the entity pages reference a plurality of product pages, the method comprising:
    receiving training data including results of an existing product relevance function for a plurality of entity pages, the training data further including an association between the plurality of entity pages and product pages for a plurality of entities;
    selecting an objective function configured to produce a degree of fit which indicates an extent to which an entity relevance function fits the training data, the training data including a plurality of queries, the entity relevance function configured to determine relevance of an entity page based upon weighted quantitative measures of features of the entity page and the queries in the training data, and the objective function being configured to increase or decrease the degree of fit based upon a comparison of the relevance of the entity page to at least one threshold value;
    identifying the plurality of entity pages based upon the plurality of product pages and the association between entity pages and product pages;
    generating the entity relevance function by at least:
        determining a current parameter range;
        generating an entity relevance values by invoking the objective function, using the plurality of entity pages in the training data as input, for each set of parameters in the current parameter range; and
        determining the degree of fit for the entity relevance values to the existing product relevance values; and
    providing the entity relevance function to a search engine for use in determining relevancies of entity pages to subsequent queries.

2. The method of claim 1, wherein the objective function is configured to increase the degree of fit for relevance values within a defined range, and decrease the degree of fit for relevance values outside the defined range.

3. The method of claim 2, wherein the objective function is configured to increase the degree of fit, for relevance values within the defined range, in proportion to the relevance values if a quality measure of the entity page is above a quality threshold, and further configured to decrease the degree of fit, for relevance values within the defined range, in proportion to the relevance values if the quality measure is below the quality threshold.

4. The method of claim 1, wherein the weighted quantitative measures of the entity page features comprise one or more textual scores of the entity page, popularity of the entity page, quality of the entity page, or a combination thereof.

5. A method of determining relevance of documents to queries, the method comprising:
    generating a candidate relevance function configured to produce candidate relevance values for documents of a first type;
    determining a degree of fit of the candidate relevance values to existing relevance values of documents of a second type, the degree of fit being based upon the candidate relevance values of documents of the first type to queries, the existing relevance values of documents of the second type, quantitative features of the documents of the first type, and quantitative features of the queries;
    generating an optimized relevance function that produces values having an optimized degree of fit greater than the degree of fit of the candidate relevance values, the generating an optimized relevance function comprising:
  determining a current parameter range;
  generating the candidate relevance values by invoking the candidate relevance function, using the documents of the first type as input, for each set of parameters in the current parameter range; and
  determining the degree of fit of the candidate relevance values to the existing relevance values of documents of the second type; and
providing the optimized relevance function to a search engine for use in determining relevancies of documents of the first type to subsequent queries.

6. The method of claim 5, further comprising identifying the documents of the first type based upon the documents of the second type and an association between the documents of the first type and the documents of the second type.

7. The method of claim 6, wherein the candidate relevance values produced by the candidate relevance function are based upon a corresponding weighted sum of quantitative features of the documents of the first type, and
  wherein the quantitative features are weighted by candidate parameters, and the candidate parameters include a parameter value corresponding to each of the document features.

8. The method of claim 7, wherein the optimized relevance function comprises a sum of features weighted by optimized parameters, and the optimized parameters are the values of the candidate parameters that produce a weighted sum that maximizes the degree of fit of the candidate relevance values to the existing relevance values.

9. The method of claim 6,
  wherein each of the plurality of candidate relevance values comprises a sum of the results of the candidate relevance function for documents of the first type, and
  wherein the optimized parameters are the candidate parameters that cause the candidate relevance function to produce a maximum degree of fit in the current parameter range at the current resolution.

10. The method of claim 5, further comprising:
  increasing the degree of fit for a first range of relevance values produced by the candidate relevance function that are less than a limiting existing relevance value of one of the documents of the second type; and
  decreasing the degree of fit for a second range of relevance values that are greater than the limiting existing relevance value.

11. The method of claim 10, wherein increasing the degree of fit comprises increasing the degree of fit for candidate relevance values within a defined range, and decreasing the degree of fit comprises decreasing the degree of fit for candidate relevance values outside the defined range.

12. The method of claim 11, wherein increasing the degree of fit comprises increasing the degree of fit in proportion to the candidate relevance values within the defined range for documents of the first type that have a document quality greater than a threshold value, and
  wherein decreasing the degree of fit comprises decreasing the degree of fit in inverse proportion to the candidate relevance values inside the defined range for input documents of the first type that have a document quality less than the threshold value.

13. The method of claim 5, wherein the documents of the first type comprise entity pages, and the documents of the second type comprise product pages.

14. The method of claim 5, wherein the quantitative features comprise field-weighted proximity, field coverage, unit sales, popularity, quality, or a combination thereof.

15. A system for determining relevance of entity pages to queries, wherein the entity pages reference product pages the system comprising:
  a processor; and
  a memory device including instructions that, when executed by the processor, cause the processor to:
    receive training data including results of an existing product relevance function for a plurality of entity pages, and an association between the plurality of entity pages and product pages for a plurality of entities;
    receive an objective function configured to produce a degree of fit which indicates an extent to which an optimized entity relevance function fits the training data, the optimized entity relevance function configured to determine relevance of an entity page based upon weighted quantitative measures of features of the entity page, and the objective function being configured to increase or decrease the degree of fit based upon a comparison of the relevance of the entity page to at least one threshold value;
    identify the plurality of entity pages based upon the plurality of product pages and the association between entity pages and product pages;
    generate the optimized entity relevance function comprising:
      determining a current parameter range;
      generating an entity relevance values by invoking the objective function, using the plurality of entity pages in the training data as input, for each set of in the current parameter range; and
      determining the degree of fit for the entity relevance values to the existing product relevance values; and
    provide the optimized entity relevance function to a search engine for use in determining relevancies of entity pages to subsequent queries.

16. A system for determining relevance of documents to queries, the system comprising:
  a processor; and
  a memory device including instructions that, when executed by the processor, cause the processor to:
    generate a candidate relevance function configured to produce candidate relevance values for documents of a first type;
    determine a degree of fit of the candidate relevance values to existing relevance values of documents of a second type, the degree of fit being based upon the candidate relevance values, the existing relevance values, and quantitative features of the documents of the first type;
    generate an optimized relevance function that produces values having an optimized degree of fit greater than the degree of fit of the candidate relevance values, the generating an optimized relevance function comprising:
      determining a current parameter range;
      generating candidate relevance values by invoking the candidate relevance function, using the documents of the first type as input, for each set of parameters in the current parameter range; and
      determining the degree of fit of the candidate relevance values to the existing relevance values of documents of the second type; and
    provide the optimized relevance function to a search engine for use in determining relevancies of documents of the first type to subsequent queries.

17. The system of claim 16, the memory device further including instructions that, when executed by the processor, cause the processor to:
- identify the documents of the first type based upon the documents of the second type and an association between the documents of the first type and the documents of the second type.

18. The system of claim 17, wherein the candidate relevance values produced by the candidate relevance function are based upon a corresponding weighted sum of quantitative features of the documents of the first type, and
- wherein the quantitative features are weighted by candidate parameters, and the candidate parameters include a parameter value corresponding to each of the document features.

19. The system of claim 17,
- wherein each of the plurality of candidate relevance values comprises a sum of the results of the candidate relevance function for documents of the first type, and
- wherein the optimized parameters are the candidate parameters that cause the candidate relevance function to produce a maximum degree of fit in the current parameter range at the current resolution.

20. The system of claim 16, the memory device further including instructions that, when executed by the processor, cause the processor to:
- increase the degree of fit for a first range of relevance values produced by the candidate relevance function that are less than a limiting existing relevance value of one of the documents of the second type; and
- decrease the degree of fit for a second range of relevance values that are greater than the limiting existing relevance value.

21. The system of claim 20, the memory device further including instructions that, when executed by the processor, cause the processor to:
- increase the degree of fit for candidate relevance values within a defined range; and
- decrease the degree of fit for candidate relevance values outside the defined range.

22. The system of claim 21, the memory device further including instructions that, when executed by the processor, cause the processor to:
- increase the degree of fit in proportion to the candidate relevance values within a defined range for documents of the first type that have a document quality greater than a threshold value; and
- decrease the degree of fit in inverse proportion to the candidate relevance values inside the defined range for input documents of the first type that have a document quality less than the threshold value.

23. A computer program product embedded in a non-transitory computer readable medium with processor-executable instructions embedded thereon for determining relevance of documents to queries, the computer program product comprising:
- program code for generating a candidate relevance function configured to produce candidate relevance values for documents of a first type;
- program code for determining a degree of fit of the candidate relevance values to existing relevance values of documents of a second type, the degree of fit being based upon the candidate relevance values, the existing relevance values, and quantitative features of the documents of the first type;
- program code for generating an optimized relevance function that produces values having an optimized degree of fit greater than the degree of fit of the candidate relevance values, the generating an optimized relevance function comprising:
  - determining a current parameter range;
  - generating candidate relevance values by invoking the candidate relevance function, using the documents of the first type as input, for each set of parameters in the current parameter range; and
  - determining the degree of fit of the candidate relevance values to the existing relevance values of documents of the second type; and
- program code for providing the optimized relevance function to a search engine for use in determining relevancies of documents of the first type to subsequent queries.

24. The computer program product of claim 23, further comprising program code for identifying the documents of the first type based upon the documents of the second type and an association between the documents of the first type and the documents of the second type.

25. The computer program product of claim 23, further comprising:
- program code for increasing the degree of fit for a first range of relevance values produced by the candidate relevance function that are less than a limiting existing relevance value of one of the documents of the second type; and
- program code for decreasing the degree of fit for a second range of relevance values that are greater than the limiting existing relevance value.

26. The computer program product of claim 25, wherein increasing the degree of fit comprises increasing the degree of fit in proportion to the candidate relevance values within a defined range for documents of the first type that have a document quality greater than a threshold value, and
- wherein decreasing the degree of fit comprises decreasing the degree of fit in proportion to the candidate relevance values outside the defined range for input documents of the first type that have a document quality less than the threshold value.

27. The computer program product of claim 23, wherein the candidate relevance values produced by the candidate relevance function are based upon a corresponding weighted sum of quantitative features of the documents of the first type, and
- wherein the quantitative features are weighted by candidate parameters, and the candidate parameters include a parameter value corresponding to each of the document features.

28. The computer program product of claim 23, further comprising program code for repeating the generating of the optimized relevance function until a user-specified criterion is satisfied.

* * * * *